United States Patent
Boyle et al.

(10) Patent No.: US 11,584,206 B2
(45) Date of Patent: Feb. 21, 2023

(54) VEHICLE CONVERTIBLE TOP SYSTEMS

(71) Applicants: Michael S Boyle, Berkley, MI (US); Joshua Hall, Fraser, MI (US); Robert Rizzo, Macomb, MI (US); Cole T Schaenzer, Royal Oak, MI (US); Christopher J Allen, Pleasant Ridge, MI (US); Jimmy L Suder, Ortonville, MI (US); Jeffery E Long, Canton, MI (US); Robert H Perkins, Oxford, MI (US); Mikil L Sockow, Troy, MI (US); David C Fischer, Troy, MI (US)

(72) Inventors: Michael S Boyle, Berkley, MI (US); Joshua Hall, Fraser, MI (US); Robert Rizzo, Macomb, MI (US); Cole T Schaenzer, Royal Oak, MI (US); Christopher J Allen, Pleasant Ridge, MI (US); Jimmy L Suder, Ortonville, MI (US); Jeffery E Long, Canton, MI (US); Robert H Perkins, Oxford, MI (US); Mikil L Sockow, Troy, MI (US); David C Fischer, Troy, MI (US)

(73) Assignee: FCA US LLC, Auburn Hills, MI (US)

(*) Notice: Subject to any disclaimer, the term of this patent is extended or adjusted under 35 U.S.C. 154(b) by 0 days.

(21) Appl. No.: 17/124,853

(22) Filed: Dec. 17, 2020

(65) Prior Publication Data
US 2021/0178873 A1 Jun. 17, 2021

Related U.S. Application Data

(60) Provisional application No. 62/949,040, filed on Dec. 17, 2019.

(51) Int. Cl.
*B60J 7/11* (2006.01)
*B60J 7/14* (2006.01)
(Continued)

(52) U.S. Cl.
CPC ............. *B60J 7/11* (2013.01); *B60J 7/141* (2013.01); *B60J 1/085* (2013.01); *B60J 1/183* (2013.01);
(Continued)

(58) Field of Classification Search
CPC ........ B60J 1/183; B60J 1/1838; B60J 1/1823; B60J 1/1884; B60J 1/1853; B60J 1/085;
(Continued)

(56) References Cited

U.S. PATENT DOCUMENTS

| 5,015,028 A | 5/1991 | Bonnett | |
| 6,386,617 B1 * | 5/2002 | Kusuma | B60J 1/085 296/146.15 |

(Continued)

FOREIGN PATENT DOCUMENTS

| DE | 202019101398 U1 * | 3/2019 | ............. B60R 9/058 |
| EP | 1184218 B1 | 1/2007 | |

(Continued)

*Primary Examiner* — Jason S Morrow
*Assistant Examiner* — Wenwei Zhuo
(74) *Attorney, Agent, or Firm* — Ralph E. Smith

(57) ABSTRACT

A vehicle includes a vehicle body including a truck bed at least partially defining a cargo area, a vehicle interior with passenger seating, and a multi-component hard top assembly configured to selectively and removably couple to the vehicle body to provide an enclosed configuration at least partially enclosing the vehicle interior. The multi-component hard top assembly includes a rear window assembly configured to selectively and removably couple to the vehicle body.

1 Claim, 6 Drawing Sheets

(51) Int. Cl.
   *B60J 1/08* (2006.01)
   *B60J 1/18* (2006.01)
   *B60J 7/10* (2006.01)
   *B60J 7/00* (2006.01)
   *B62D 33/04* (2006.01)

(52) U.S. Cl.
   CPC ............ *B60J 1/1823* (2013.01); *B60J 7/0076* (2013.01); *B60J 7/106* (2013.01); *B62D 33/04* (2013.01)

(58) Field of Classification Search
   CPC ... B60J 7/11; B60J 7/106; B60J 7/1628; B60J 7/1664; B60J 5/0487
   USPC ........................ 296/147, 148, 146.16, 107.07
   See application file for complete search history.

(56) References Cited

U.S. PATENT DOCUMENTS

| | | | |
|---|---|---|---|
| 7,240,960 B2 | 7/2007 | Fallis, III et al. | |
| 8,408,623 B1* | 4/2013 | McAuliff | B60J 7/11 296/24.33 |
| 8,764,095 B2 | 7/2014 | Ritzinger et al. | |
| 8,991,896 B1* | 3/2015 | Whitehead | B60J 7/106 296/121 |
| 10,611,217 B2* | 4/2020 | Willard | B60J 7/194 |
| 2002/0105205 A1 | 8/2002 | Willard | |
| 2005/0044799 A1 | 3/2005 | Kinross et al. | |
| 2007/0102966 A1* | 5/2007 | Hesse | B60J 7/047 296/216.01 |
| 2007/0164587 A1* | 7/2007 | Brockhoff | B60J 7/11 296/218 |
| 2008/0231072 A1 | 9/2008 | Franco et al. | |
| 2010/0078957 A1* | 4/2010 | Byrnes | E05D 11/0081 296/50 |
| 2015/0283951 A1 | 10/2015 | Singleton | |
| 2018/0222299 A1* | 8/2018 | Volpicelli | B60J 7/1642 |
| 2019/0241053 A1* | 8/2019 | Desai | B60J 1/14 |
| 2019/0329638 A1* | 10/2019 | Willard | B60J 7/194 |
| 2020/0018104 A1* | 1/2020 | Mitchell | E05D 5/062 |
| 2022/0111712 A1* | 4/2022 | Burgett | B60J 1/183 |

FOREIGN PATENT DOCUMENTS

| | | | | |
|---|---|---|---|---|
| FR | 2985456 A1 * | 7/2013 | ............ | B60J 1/1823 |
| FR | 2985456 A1 | 7/2013 | | |
| WO | 2013/112957 A1 | 8/2013 | | |

* cited by examiner

VEHICLE CONVERTIBLE TOP SYSTEMS

CROSS REFERENCE TO RELATED APPLICATION

This application claims the benefit of U.S. Prov. App. No. 62/949,040, filed Dec. 17, 2019, the contents of which are incorporated herein by reference thereto.

FIELD

The present application relates generally to vehicle convertible top systems and, more particularly, to rear window assemblies for vehicle multi-component hard top systems.

BACKGROUND

It is known in the motor vehicle art to provide a convertible top, which may be folded back or removed from the vehicle. In one example, the convertible top is constructed of a rigid/hard material (e.g., referred to as a hard top). Such convertible tops provide the user with the benefit of open air driving while affording available protection in the event of adverse weather conditions. However, hard tops typically must be removed as one or more large components, which can be very heavy, thus requiring multiple people or special equipment to completely remove those systems from the vehicle. Therefore, while such convertible tops work well for their intended purpose, it is desirable to provide improvements in the relevant art.

SUMMARY

In accordance with one example aspect of the invention, a vehicle is provided. In one example implementation, the vehicle includes a vehicle body including a truck bed at least partially defining a cargo area, a vehicle interior with passenger seating, and a multi-component hard top assembly configured to selectively and removably couple to the vehicle body to provide an enclosed configuration at least partially enclosing the vehicle interior. The multi-component hard top assembly includes a rear window assembly configured to selectively and removably couple to the vehicle body.

In addition to the foregoing, the described vehicle may include one or more of the following features: wherein the rear window assembly includes a frame supporting a glass window; wherein the vehicle body further includes a wall separating the cargo area and the vehicle interior, wherein the wall includes a channel formed therein to slidingly receive the window assembly; wherein the multi-component hard top assembly further includes a pair of removable C-pillars each separately removable from the vehicle body, wherein removal of at least one C-pillar of the pair of removable C-pillars enables the rear window assembly to slide out of the channel and be removed from the vehicle; and wherein the multi-component hard top assembly is detachable from the vehicle body to provide an open air configuration for the vehicle interior.

In addition to the foregoing, the described vehicle may include one or more of the following features: wherein the hard top assembly includes a plurality of removable roof panels selectively coupleable to the vehicle body to create a substantially contiguous roof over the vehicle interior, wherein each removable roof panel of the plurality of removable roof panels is separately removable from the vehicle body to provide an open air configuration at that specific location of the hard top assembly while enabling a user to detach, remove, and transport a smaller portion of the hard top assembly without assistance or specialized equipment; and wherein the multi-component hard top assembly further comprises a pair of removable C-pillars each separately removable from the vehicle body to provide further open air configuration while enabling the user to detach, remove, and transport the C-pillars of the hard top assembly without assistance or specialized equipment.

In addition to the foregoing, the described vehicle may include one or more of the following features: wherein the removable rear window assembly is selectively detachable from the vehicle body to provide an open air configuration at the passenger seating while enabling the user to detach, remove, and transport the removable rear window assembly of the hard top assembly without assistance or specialized equipment; wherein the plurality of removable roof panels includes a left front removable roof panel configured to removably couple to the vehicle body in a location above a driver's side of front passenger seating, and a right front removable roof panel configured to removably couple to the vehicle body in a location above a front passenger side of the front passenger seating; and wherein the plurality of removable roof panels includes a rear removable roof panel configured to removably couple to the vehicle body in a location above rear passenger seating.

In addition to the foregoing, the described vehicle may include one or more of the following features: wherein the rear window assembly is further rotatably coupled to the vehicle body and movable between an upward closed position and a lowered open position that provides an open air configuration to the passenger seating; wherein the vehicle body further includes a wall separating the cargo area and the vehicle interior, wherein the rear window assembly is hingedly coupled to the wall by at least one hinge assembly; wherein the at least one hinge assembly comprises a hinge coupled to the rear window assembly, and a pair of knuckles coupled to the wall; wherein the hinge includes a pin coupled to the rear window via a hinge arm; wherein the pair of knuckles includes a first knuckle and a second knuckle, wherein the first knuckle includes first and second semicircular portions with a gap defined therebetween, and wherein the second knuckle includes a bore configured to receive the pin; and wherein when the rear window is positioned in an intermediate position between the open and closed positions, the hinge arm aligns with the gap such that the rear window assembly can slide sideways with the hinge arm passing through the gap, to thereby detach the rear window assembly from the vehicle.

In accordance with another example aspect of the invention, a vehicle is provided. In one example implementation, the vehicle includes a vehicle body including a truck bed at least partially defining a cargo area, a vehicle interior with passenger seating, and a multi-component hard top assembly configured to selectively and removably couple to the vehicle body to provide an enclosed configuration at least partially enclosing the vehicle interior. The multi-component hard top assembly includes a rear window assembly rotatably coupled to the vehicle body. The rear window assembly is movable between an upward closed position and a lowered open position that provides an open air configuration to the passenger seating.

In addition to the foregoing, the described vehicle may include one or more of the following features: wherein the rear window assembly is rotatably coupled to the vehicle body by at least one hinge assembly; and wherein in an intermediate position between the open position and the closed position, the rear window assembly is selectively detachable from the vehicle body.

Further areas of applicability of the teachings of the present disclosure will become apparent from the detailed description, claims and the drawings provided hereinafter, wherein like reference numerals refer to like features throughout the several views of the drawings. It should be understood that the detailed description, including disclosed embodiments and drawings referenced therein, are merely exemplary in nature intended for purposes of illustration only and are not intended to limit the scope of the present disclosure, its application or uses. Thus, variations that do not depart from the gist of the present disclosure are intended to be within the scope of the present disclosure.

DESCRIPTION

According to the principles of the present application, systems and methods are described for vehicle convertible top systems. In the example embodiments, the convertible top systems include a modular, multi-piece hard top assembly that enables removal of one or more rigid hard top pieces above passengers to create a more open air experience, particularly for rear seat passengers. Additionally, the convertible top systems include a removable or foldable rear window assembly, which provides further increased open air driving and/or the ability for cargo to extend therethrough. Such a design advantageously breaks the hard top assembly into more manageable pieces, thereby making the removal of the hard top much easier.

Figure 1:
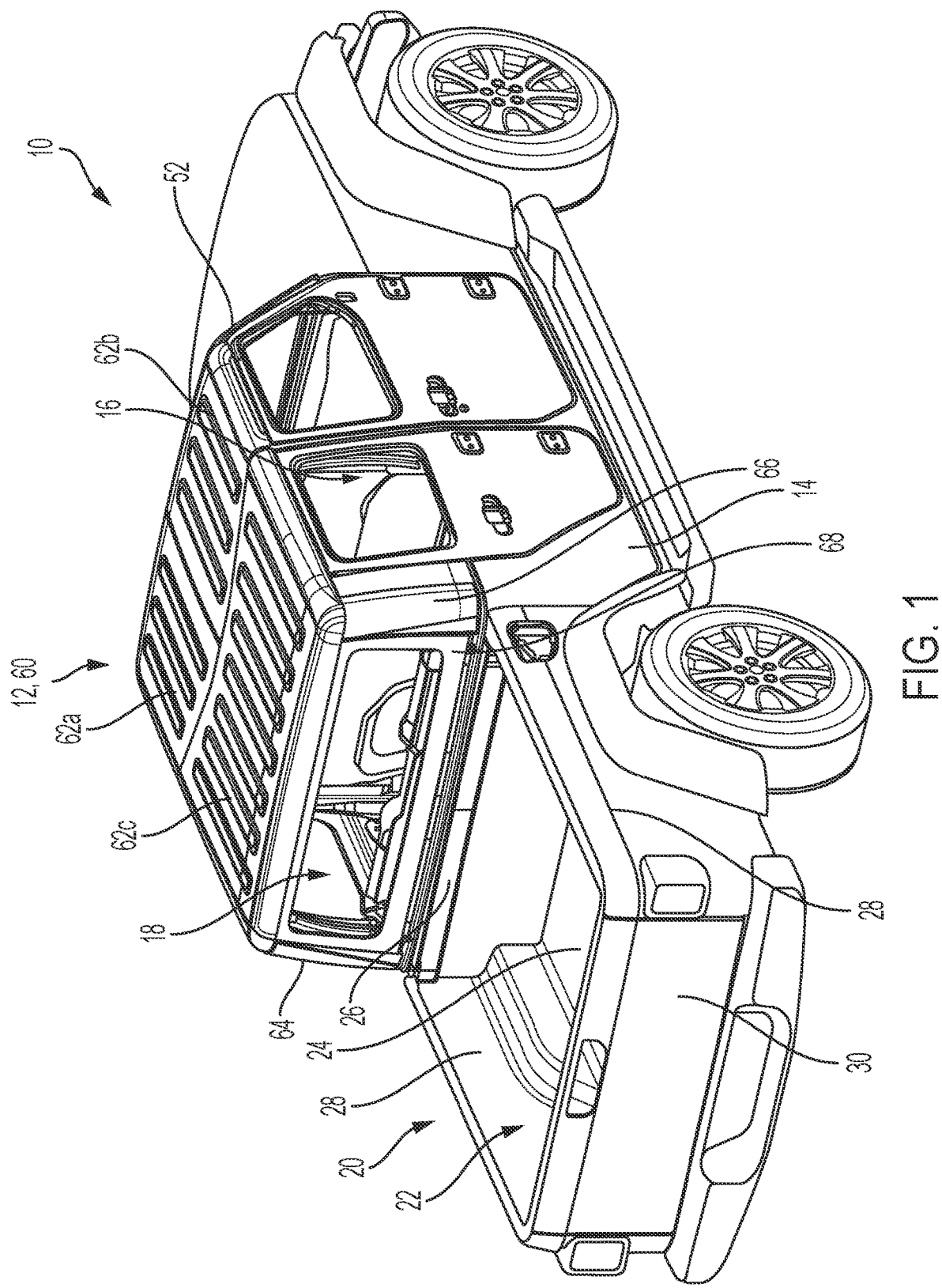
FIG. 1 is a perspective view of a vehicle with an example modular multi-component hard top assembly in accordance with the principles of the present disclosure.
Figure 2:
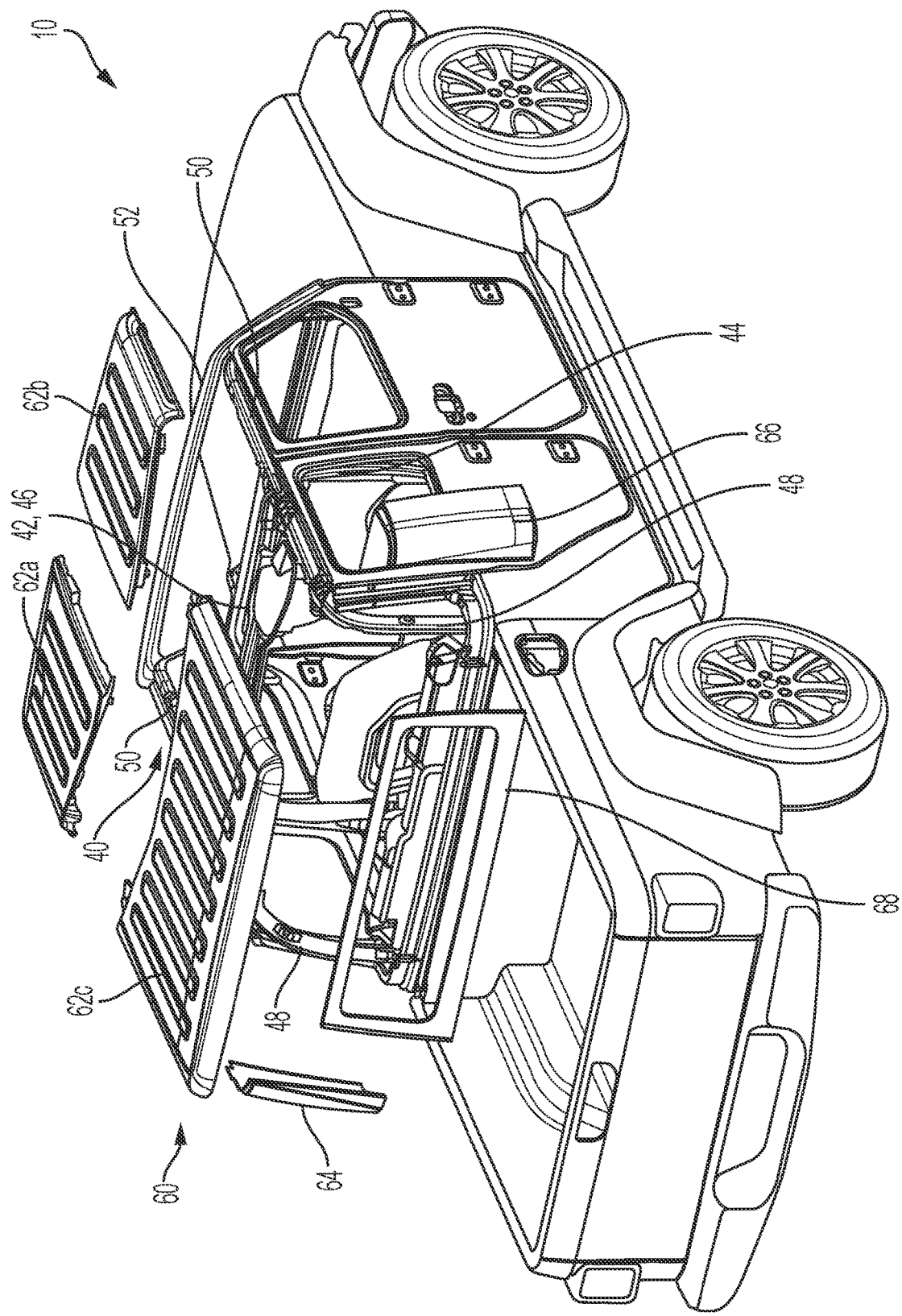
FIG. 2 is an exploded view of the example hard top assembly shown in FIG. 1, in accordance with the principles of the present disclosure.

With initial reference to FIGS. 1 and 2, a vehicle 10 having a convertible top system 12 in accordance with the principles of the present disclosure is illustrated. In the example embodiment, the vehicle 10 generally includes a vehicle body 14, an interior with front passenger seating 16 and rear passenger seating 18, and a storage or truck bed 20. In the example embodiment, vehicle 10 is a pickup truck, but it will be appreciated that the systems described herein may be utilized with various other types of vehicles. The truck bed 20 provides a cargo area 22 defined at least partially by a floor 24, a forward wall 26, side walls 28, and a tailgate 30. As shown, the forward wall 26 separates the cargo area 22 and the vehicle interior along with an interior cabin rear wall 32.

In the example embodiment, as shown in FIG. 2, a roll bar assembly 40 extends upwardly from the vehicle body 14 and includes a generally U-shaped main roll bar 42 formed by a pair of laterally spaced apart vertical members 44 interconnected by a transverse member 46. A pair of rear roll bars 48 are coupled to the main roll bar 42 and extend rearward therefrom and downwardly to the vehicle body 14. A pair of laterally spaced apart side bars 50 are coupled to the main roll bar 42 and extend forwardly to a vehicle windshield assembly 52.

Figure 7:
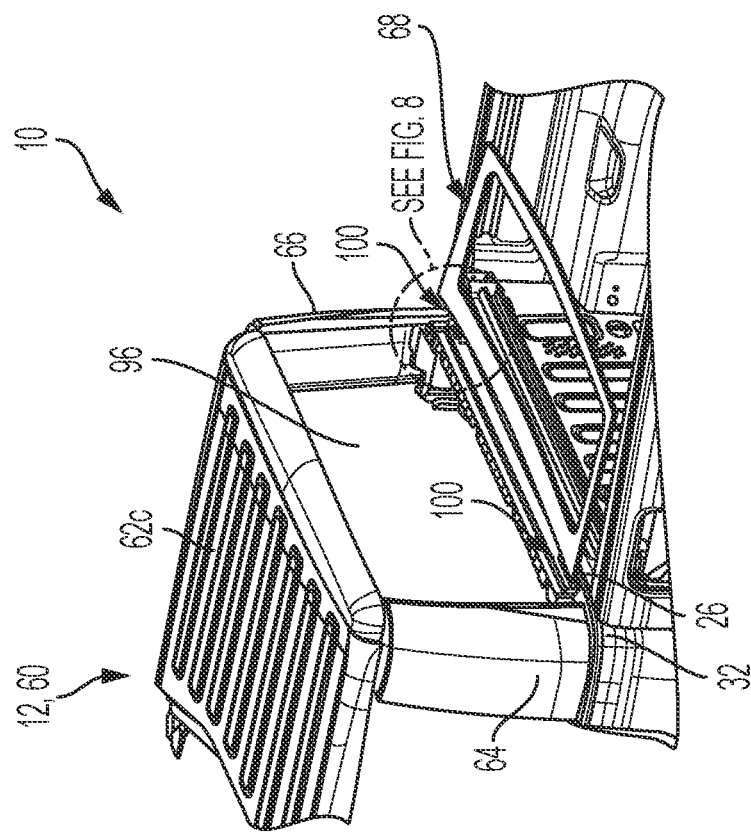
FIG. 7 is a rear perspective of the vehicle of FIG. 5 with the rear window assembly in an open position, in accordance with the principles of the present disclosure.

With continued reference to FIG. 1, in the example embodiment, the convertible top system 12 is a multi-component hard top assembly 60 that generally includes a plurality of removable front passenger roof panels 62a-b, a removable rear passenger roof panel 62c, a pair of removable C-pillars 64, 66, and a rear window assembly 68. As shown in FIG. 2, each of the front passenger roof panels 62a-b, rear passenger roof panel 62c, removable C-pillars 64, 66, and rear window assembly 68 are separately and removably secured to the roll bar assembly 40 and/or windshield assembly 52. In some examples, the roof panels 62a-b are a single panel. In other examples described herein, the rear window assembly 68 can be rotatably coupled to the rear wall 32 to enable the rear window assembly 68 to move between a closed, upward position (FIG. 5) and an open, downward position (FIG. 7).

Figure 4:
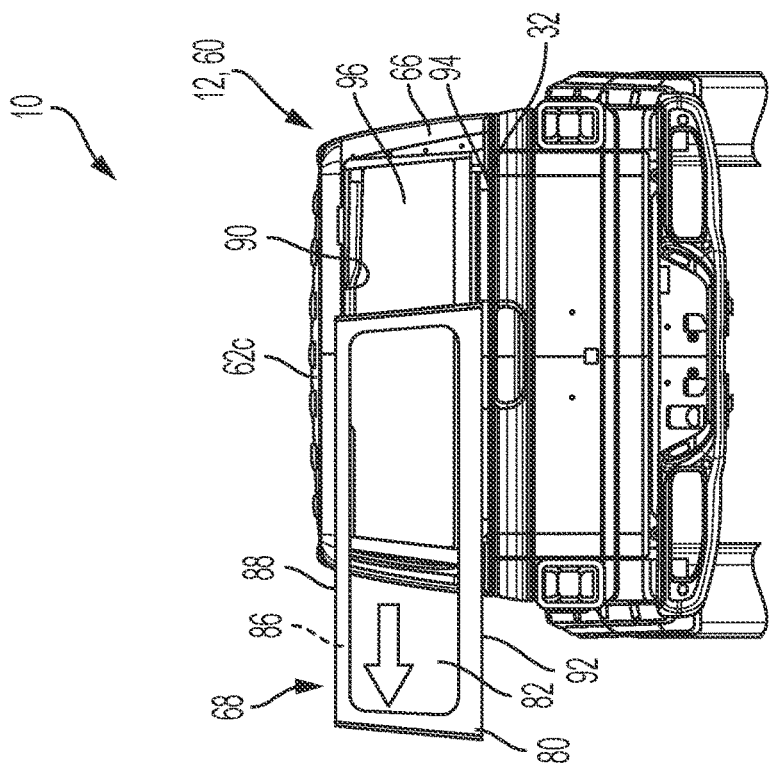
FIG. 4 is a rear view of the vehicle of FIG. 3 during a second step to remove the rear window assembly, in accordance with the principles of the present disclosure.
Figure 3:
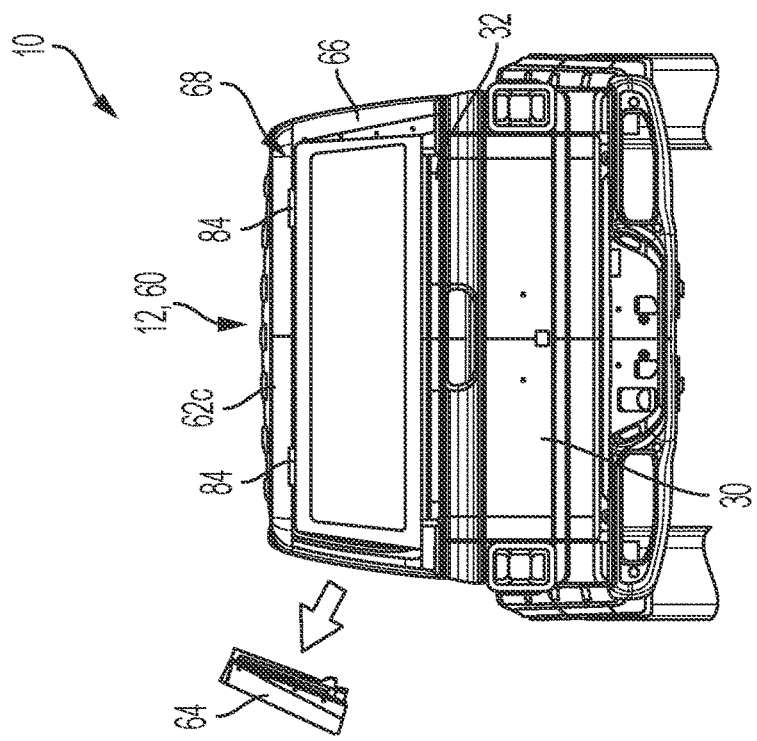
FIG. 3 is a rear view of the vehicle of FIG. 1 during a first step to remove an example rear window assembly, in accordance with the principles of the present disclosure.

With reference now to FIGS. 3 and 4, in one example embodiment, rear window assembly 68 is removable from the vehicle and generally includes a frame 80, a glass window 82, and one or more locking device 84 (shown schematically). The frame 80 is configured to receive and support the glass window 82, and the locking device(s) 84 are coupled to an inner surface 86 of the frame 80. The locking devices 84 are configured to move between a locked position that secures the rear window assembly 68 to the rear wall 32, C-pillars 64, 66, and/or rear passenger roof panel 62c, and an unlocked position that releases the rear window assembly 68. In one example, locking devices 84 are locking levers configured to rotate (e.g., 90°) from a locked position that engages another component such that the panel is locked thereto, to an unlocked position where the locking lever does not engage the other component, thereby allowing separation of the rear window assembly 68 from the other component.

In the example embodiment, an upper edge 88 of the window assembly 68 is received within a slot or channel 90 formed in the rear passenger roof panel 62c, and a lower edge 92 of the window assembly 68 is received within a slot or channel 94 formed in an upper surface of the rear wall 32. In alternative configurations, only one channel 90, 94 is present. As shown in FIG. 3, when in an installed position, rear window assembly 68 is disposed within the channels 90, 94 and bounded on either side by C-pillars 64, 66.

With additional reference to FIG. 4, to remove rear window assembly 68, one of C-pillars 64, 66 is removed. The rear window assembly 68, which is held in place by the rear wall 32 and/or rear passenger roof panel 62c, is subsequently slid outward from the channels 90, 94. The removed C-pillar 64, 66 may then be reattached to vehicle 10 to create a rear window opening 96 with an open air configuration where the rear window assembly 68 used to be. Alternatively, the other C-pillar 64, 66 can also be removed to create a further open air configuration.

Advantageously, removal of the rear window assembly 68 increases air circulation in the passenger compartment and adds more cargo room for the truck bed 20 by allowing a user to utilize the passenger compartment as well as the truck bed 20 for moving long objects that might otherwise hang over the tailgate 30. As such, the complete back glass can be removed to create a full flow through design with reduced wind recirculation and wind noise, while allowing more cargo room for longer objects/cargo.

Figure 8:
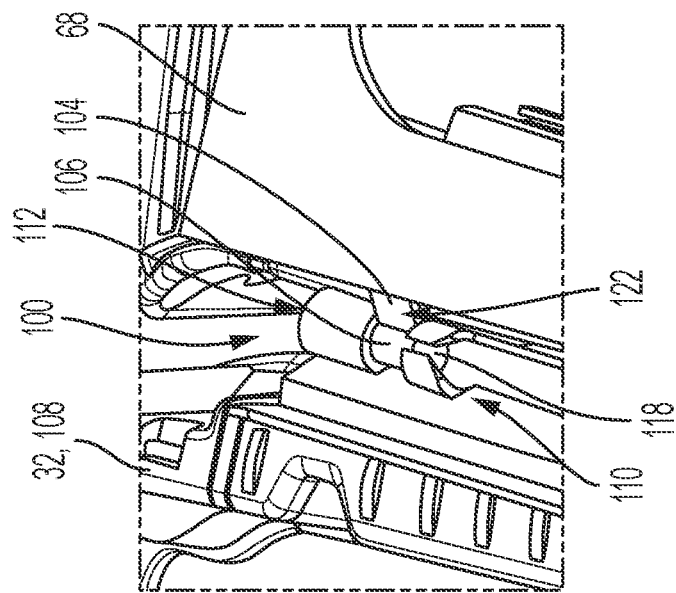
FIG. 8 is an enlarged view of the hinge assembly of the rear window assembly shown in FIG. 7, in accordance with the principles of the present disclosure.
Figure 9:
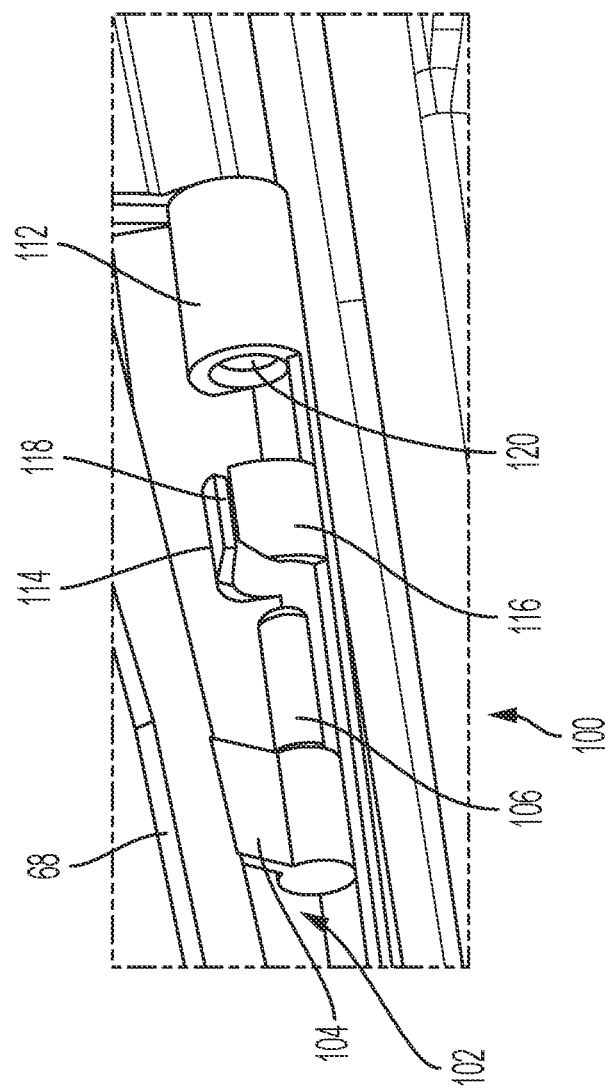
FIG. 9 is an enlarged view of the hinge assembly in a removal position, in accordance with the principles of the present disclosure.

With reference now to FIGS. 5-9, another example removable rear window assembly 68 is shown and described. In the example embodiment, the removable rear window assembly 68 is hingedly coupled to the rear wall 32 and is movable between an upward closed position (FIGS. 5 and 6), a folded-down open position (FIGS. 7 and 8), and an intermediate, removal position (FIG. 9). As illustrated, the rear window assembly 68 is hingedly coupled to the rear wall 32 by one or more hinge assemblies 100 (two shown).

In the example embodiment, the window assembly lower edge 92 includes one or more hinges 102 extending downwardly therefrom, and each hinge 102 includes an arm 104 and a transverse pin 106. The upper surface 108 of rear wall 32 includes spaced apart first and second knuckles 110, 112. In the example implementation, the first knuckle 110 includes a first semi-circular portion 114 and a second semi-circular portion 116 defining a slot or gap 118 therebetween. As shown in FIG. 9, the gap 118 is configured to enable hinge arm 104 to slide therethrough for coupling/uncoupling of the hinge assembly 100. The second knuckle 112 defines a bore 120 (e.g., FIG. 9) configured to selectively receive transverse pin 106, for example, as shown in FIG. 6.

Figure 6:
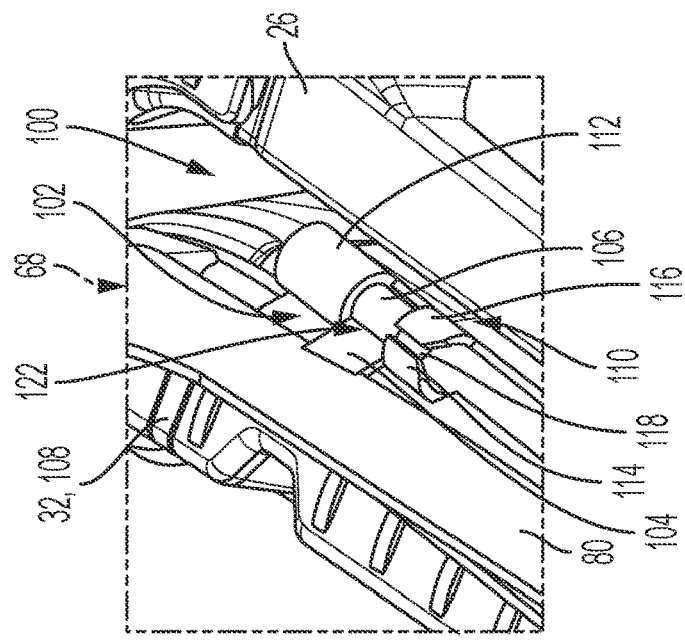
FIG. 6 is an enlarged view of a hinge assembly of the rear window assembly shown in FIG. 5, in accordance with the principles of the present disclosure.
Figure 5:
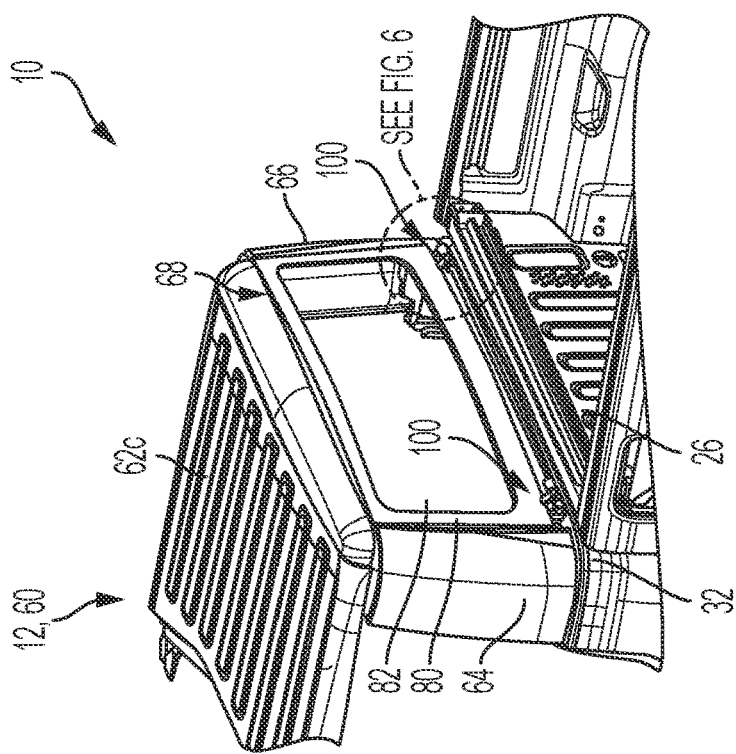
FIG. 5 is a rear perspective view of a vehicle with another example rear window assembly, in a closed position, in accordance with the principles of the present disclosure.

FIGS. 5 and 6 illustrate the removable rear window assembly 68 in the upward closed position such that rear window assembly 68 encloses the rear window opening 96. In this position, the transverse pin 106 is inserted into the knuckle bore 120 and the hinge arm 104 extends upwardly in the space 122 defined between the first and second knuckles 110, 112, as shown in FIG. 6. Accordingly, the arm 104 is disposed between second knuckle 112 and first semi-circular portion 114 such that hinge arm 104 and thus rear window assembly 68 are prevented from transverse movement, thereby maintaining the coupling between the rear window assembly 68 and the vehicle 10.

FIGS. 7 and 8 illustrate the removable rear window assembly 68 moved to the downward open position such that rear window assembly 68 no longer encloses the rear window opening 96. In this position, the transverse pin 106 is inserted into the knuckle bore 120 and the hinge arm 104 extends rearwardly in the space 122 defined between the first and second knuckles 110, 112, as shown in FIG. 8. Accordingly, the hinge arm 104 is disposed between second knuckle 112 and second semi-circular portion 116 such that hinge arm 104 and thus rear window assembly 68 are prevented from transverse movement, thereby maintaining the coupling between the rear window assembly 68 and the vehicle 10.

With reference now to FIG. 9, when a user desires to remove the rear window assembly 68 from the vehicle 10, the rear window assembly 68 is rotated to an intermediate position between the open and closed positions such that hinge arm 104 is aligned with the gap 118 between the first and second semi-circular portions 114, 116. In this position, the rear window assembly 68 can be shifted or slid sideways (leftward, as seen in FIG. 9). As the hinge arm 104 slides through the gap 118, transverse pin 106 slides out of the knuckle bore 120, thereby separating the hinge 102 from first and second knuckles 110, 112. The rear window assembly 68 may then be removed from the vehicle 10 for subsequent storage. The process is repeated in reverse to reattach the rear window assembly 68 to the vehicle 10.

Described herein are systems and methods for a vehicle having a rear window assembly removably coupled to a hard top assembly of the vehicle. In one example, the rear window assembly slides into and out of one or more channels formed in a vehicle rear to assist the user during installation/removal. In another example, the rear window assembly is removably and rotatably attached to the vehicle via one or more hinge assemblies. In an intermediate position between open and closed positions, the rear window assembly can be detached from the hinge assemblies, thereby enabling the user to remove the rear window assembly from the vehicle and provide an open air configuration. With a folding rear window, the rear window remains with the vehicle and can be quickly closed with adverse weather conditions. This allows the user to leave the hard top on the vehicle, but also have an open air feeling with a quick and reversible one-person operation.

It will be understood that the mixing and matching of features, elements, methodologies, systems and/or functions between various examples may be expressly contemplated herein so that one skilled in the art will appreciate from the present teachings that features, elements, systems and/or functions of one example may be incorporated into another example as appropriate, unless described otherwise above. It will also be understood that the description, including disclosed examples and drawings, is merely exemplary in nature intended for purposes of illustration only and is not intended to limit the scope of the present disclosure, its application or uses. Thus, variations that do not depart from the gist of the present disclosure are intended to be within the scope of the present disclosure.

What is claimed is:

1. A vehicle comprising:
   a vehicle body including a truck bed at least partially defining a cargo area;
   a vehicle interior with passenger seating; and
   a multi-component hard top assembly configured to selectively and removably couple to the vehicle body to provide an enclosed configuration at least partially enclosing the vehicle interior,
   wherein the multi-component hard top assembly includes a rear window assembly configured to selectively and removably couple to the hard top assembly and the vehicle body,
   wherein the rear window assembly is further rotatably coupled to the vehicle body and movable between an upward closed position and a lowered open position that provides an open air configuration to the passenger seating,
   wherein the vehicle body further includes a wall separating the cargo area and the vehicle interior, wherein the rear window assembly is hingedly coupled to the wall by at least one hinge assembly,
   wherein the at least one hinge assembly comprises a hinge coupled to the rear window assembly, and a pair of knuckles coupled to the wall,
   wherein the hinge includes a pin coupled to the rear window via a hinge arm,
   wherein the pair of knuckles includes a first knuckle and a second knuckle, wherein the first knuckle includes first and second semi-circular portions with a gap defined therebetween, and wherein the second knuckle includes a bore configured to receive the pin, and wherein when the rear window is positioned in an intermediate position between the open and closed positions, the hinge arm aligns with the gap such that the rear window assembly can slide sideways with the hinge arm passing through the gap, to thereby detach the rear window assembly from the vehicle.

* * * * *